US 6,965,381 B2

(12) United States Patent
Kitamura et al.

(10) Patent No.: US 6,965,381 B2
(45) Date of Patent: Nov. 15, 2005

(54) MULTI-PERSON SHARED DISPLAY DEVICE

(75) Inventors: Yoshifumi Kitamura, Osaka (JP);
Fumio Kishino, Osaka (JP); Toshihiro Masaki, Osaka (JP); Takashige Konishi, Hyogo (JP)

(73) Assignee: Japan Science and Technology Corporation, Saitama-ken (JP)

( * ) Notice: Subject to any disclaimer, the term of this patent is extended or adjusted under 35 U.S.C. 154(b) by 197 days.

(21) Appl. No.: 10/069,718

(22) PCT Filed: Jun. 29, 2001

(86) PCT No.: PCT/JP01/05656

§ 371 (c)(1),
(2), (4) Date: Jun. 18, 2002

(87) PCT Pub. No.: WO02/03124

PCT Pub. Date: Jan. 10, 2002

(65) Prior Publication Data

US 2003/0043146 A1 Mar. 6, 2003

(30) Foreign Application Priority Data

Jun. 30, 2000 (JP) ........................................ 2000-199240

(51) Int. Cl.[7] ............................................... G06T 15/00
(52) U.S. Cl. ........................... 345/473; 353/7; 359/463
(58) Field of Search ................................. 345/473, 474,
345/475; 353/7; 359/463, 630

(56) References Cited

U.S. PATENT DOCUMENTS

| 5,855,425 | A | | 1/1999 | Hamagishi ..................... 353/7 |
| 5,993,003 | A | * | 11/1999 | McLaughlin ..................... 353/7 |
| 6,040,946 | A | * | 3/2000 | Hebert ......................... 359/630 |
| 6,224,214 | B1 | * | 5/2001 | Martin et al. ..................... 353/7 |
| 6,231,201 | B1 | * | 5/2001 | Rupp ............................ 362/31 |
| 6,481,849 | B2 | * | 11/2002 | Martin et al. ..................... 353/7 |
| 6,546,208 | B1 | * | 4/2003 | Costales ...................... 396/324 |
| 6,710,920 | B1 | * | 3/2004 | Mashitani et al. ........... 359/463 |

FOREIGN PATENT DOCUMENTS

| EP | 0899969 A2 | 3/1999 |
| JP | 08-340556 | 12/1996 |
| JP | 10-42317 | 2/1998 |
| JP | 10-260377 | 9/1998 |
| JP | 11-174377 | 7/1999 |

OTHER PUBLICATIONS

Katsuyuki Omura et al., "Stereoscopic Display System Employing Eye–Position Tracking for Multi–Viewers", pp. 118–122, 3D Image Conference '94 (1994).

Tsutomu Miyasato et al., "A Study of a Multi–Stereoscopic Display System for Multi–viewers (*Fukusuunin–you Dokuritsu Rittai Eizou hyoji no Kentou*)", A–16–27, p. 393, The Institute of Electronics, Information and Communication Engineers (Mar. 1997).

(Continued)

*Primary Examiner*—Phu K. Nguyen
(74) *Attorney, Agent, or Firm*—Rader, Fishman & Grauer PLLC (57) ABSTRACT

The object of the present invention is to provide a multi-person shared display device with which a display device can be shared by a plurality of persons. For this purpose, a display device of the present invention is configured by a large screen display 112 and a display mask 114, which covers and hides a portion thereof. The display mask 114 is disposed at a position only an appropriate distance away from a display surface 116. The display mask 114 has a hole 118, and only through that portion can the display surface 116 of display 112 be seen. By introducing such display mask 114, the region visible upon the display surface differs depending on the viewpoint position of the user. As a result, it becomes possible to provide different content for every user.

8 Claims, 10 Drawing Sheets

OTHER PUBLICATIONS

Yoshifumi Kitamura, "Interaction with 3 Dimensional Display (*3 Jigen Display niyoru Interaction*), " vol. 15, No. 1, pp. 33–41, The Journal of Three Dimensional Images, 3D Forum (Mar. 2001).

Yoshifumi Kitamura et al., "Interactive Stereoscopic Display for Three or More Users," SIGGRAPH 2001 Conference Proceedings, Annual Conference Series, 12–17 (Aug. 2001).

* cited by examiner

(a) IMAGE FOR RIGHT EYE (b) IMAGE FOR LEFT EYE

MULTI-PERSON SHARED DISPLAY DEVICE

TECHNOLOGICAL FIELD

The present invention relates to a display device. In particular, it is related to display device allowing a plurality of users to share a common display device.

BACKGROUND TECHNOLOGY

In recent years, computers and the environment surrounding computers has been rapidly expanding. Together with such expansion, technology using computers is widely used and has become commonplace so that these days computers can be seen in every aspect of our daily lives.

Within this expansion of the environment surrounding computers, technology related to virtual reality is also expanding. The increasing speed of computers has made it possible to bring the construction of complicated virtual environments to even greater heights. Currently, this virtual reality technology has come to be used in various fields, and objects realized in virtual worlds are wide-ranging from large scale to small scale and high definition, such as outer space, metropolitan areas, environments in nature, manufactured products, internal organs, small animals, cells, and atoms. Moreover, not only is it being used for that which actually exists and can be actually seen, but also it is being used to visualize temperature distribution, airflow, and electromagnetic fields, which cannot actually be seen.

Amazing expansion has been attained in three-dimensional image display technology used to achieve such virtual reality, and utilization thereof ranging from installations at expositions or use for amusement purposes, to applications in the fields of education and medicine and applications in the various design, CAD/CAM, and measurement fields deserves our attention.

Techniques of displaying three-dimensional images are generally classified into a technique where a stereoscopic image is formed using an appropriate method and having the viewer of such image view it without assistance, and a binocular disparity technique devised so that, instead of a stereoscopic image, a right-eye view and a left-eye view of a flat image is formed and the right-eye view is viewed by the right eye and the left-eye view is viewed by the left eye. Typical examples of the former include holography and integral photography, and the latter includes three-dimensional movies where polarized glasses or liquid crystal shutters are used, and three-dimensional television using lenticular film.

These techniques of forming three-dimensional images, as typified by holography, still have unresolved technical issues preventing full color, high resolution, and real time viewing.

The binocular disparity technique is based on ergonomics, and provides three-dimensional images giving an enhanced 'real' feeling, and superior immersion and sensory feelings. However, it is not possible to freely change the viewpoint from which the three-dimensional object shown is viewed to coordinate with the user's movements using this technique by itself.

A method which modifies the three-dimensional image in accordance with the viewpoint and position of the viewer, a device (e.g., magnetic sensors or the like) worn for measuring the position of the head (viewpoint) of the viewer plus the binocular disparity technique allows the three-dimensional image to be viewed relative to the viewpoint position. However, with this technique, the number of users for which viewpoint movement within real-space can be reflected in the virtual world is limited to one person for each display. There is no display method appropriate for a plurality of viewpoints when a plurality of users shares a common display.

There are methods of performing time divided display for the number of users (for example, refer to MIYASATO, Tsutomu, et al., General Conference of the Institute of Electronics Information and Communication Engineers, A 16–21, 1997, or Japanese Patent Application Laid-open Hei 10-260377) and methods of driving display devices corresponding to the number of users in response to viewpoint position (for example, refer to KIMURA, Katsuyuki, et al., Conference on Three-Dimensional Imaging, 5–7, 1994). However, with the former, as the number of viewers increases, the allowable lower frequency limit of the composition of the three-dimensional view is not reached (the number of frames decreases), the display frequency is in inverse proportion to the number of users, which cause problems such as flickers to occur. With the latter, the number of display devices matching the number of users or a large-scale device is required, which is problematic in terms of price.

Thus, conventional devices for three-dimensional display of images and video have primarily come to use methods which display video for the right eye and video for the left eye using time division, and viewing is performed by putting on special glasses which open/close windows for the right and left eyes synchronous with the timing of this switching. In this case, the viewer is able to view the video via a screen from any position without distortion caused by that viewpoint positioning.

However, if a plurality of people try to view the same three-dimensional video without distortion, since the display switches back and forth between the right eye and left eye video of a plurality of positions, the time interval between displaying an image for each person that has increased the number of time divisions becomes longer, causing a flicker to be sensed.

DISCLOSURE OF INVENTION

An object of the present invention is to provide a multi-person shared display device capable of displaying in response to viewpoint movement in real space. Another object of the present invention is to provide a multi-person shared display device capable of displaying a three dimensional image.

In order to achieve the above-mentioned objects, the present invention is a multi-person shared display device, in which a display device is shared by a plurality of users; it is characterized by comprising: a display device, which displays a plurality of video for a plurality of users on a screen; a display mask, which is disposed so as to cover said display device separated by a fixed distance and has a sufficiently large hole; a position sensor, which detects a location of a user in real space corresponding to said display device; and a processing device, which is dynamically combined with said one display device and said position sensor, and displays an image corresponding to each user upon said display device in accordance with the position of the user through said position sensor.

The proposed multi-person shared display device uses a display mask in which a hole is formed and covers the display device so as to hide portions besides the hole, allowing different display regions upon the display device to be set in accordance with the viewpoint position within real space of each user. This makes it possible to perform display in response to viewpoint movements of a plurality of users.

Video to be displayed upon a display device can include video for three-dimensional viewing.

In this case, each user wears a plurality of glasses for separating said video for three-dimensional viewing displayed into that for the right eye and that for the left eye, and the plurality of video for three dimensional viewing shown on said display device, are images allowing separation between that for the right eye and that for the left eye through said plurality of glasses.

Also, glasses in which shutters for the right eye and for the left eye open and close can be used as said glasses; and said processing device can be dynamically combined with said glasses.

By forming said glasses and said position sensor as an integral unit, the position of a user can be found with little error.

BEST MODE FOR CARRYING OUT THE INVENTION

Embodiments of the present invention are described forthwith while referencing the drawings.

To begin with, an example where a three-dimensional image is shown with a multi-person shared three-dimensional display device is described.

Figure 1:
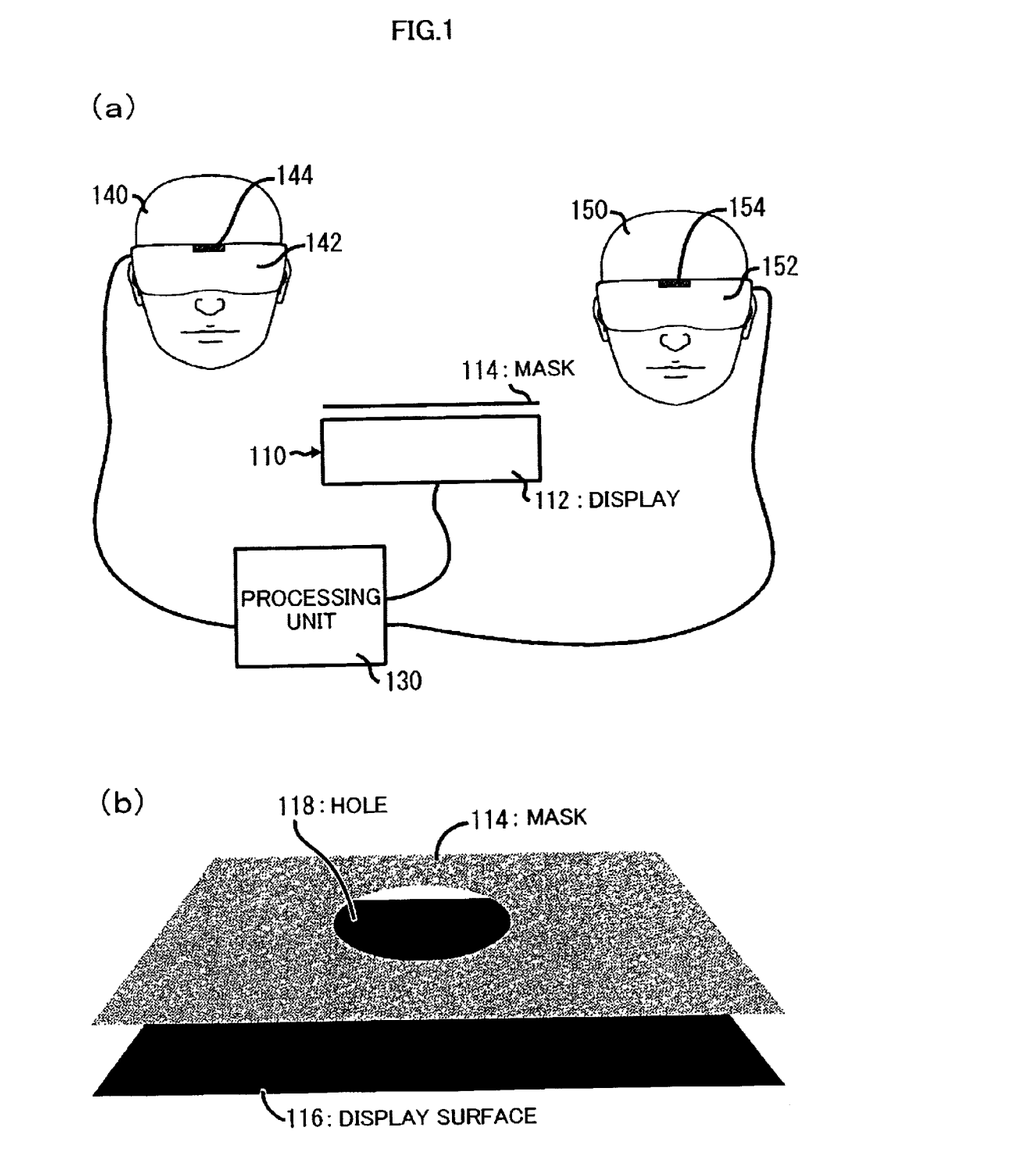
FIG. 1 is a diagram showing a configuration of an embodiment of the present invention.

FIG. 1(a) is a diagram showing a configuration of a multi-person shared three-dimensional display device according to an embodiment of the present invention. In FIG. 1(a), two users 140 and 150 of a multi-person shared three-dimensional display device each have on liquid crystal shutter glasses 142, 152, respectively, and also have a respective position sensor 144, 154 attached. The users view an image displayed upon a display screen 110 via the liquid crystal shutters. The liquid crystal shutter glasses 142, 152, position sensors 144, 154, and display device 110 are connected to a processing device 130. In conformity with the input from the position sensors, the processing apparatus 130 displays an image upon the display at a region corresponding to each respective user.

The display device 110, as shown in FIG. 1(b), is configured from a display 112 and a display mask 114, which covers and hides a portion thereof. The display mask 114 is set at a position separated only an appropriate distance away from a display surface 116. A hole 118 is formed in the display mask 114, and through only that portion can the surface 116 of the display 112 be seen.

Figure 2:
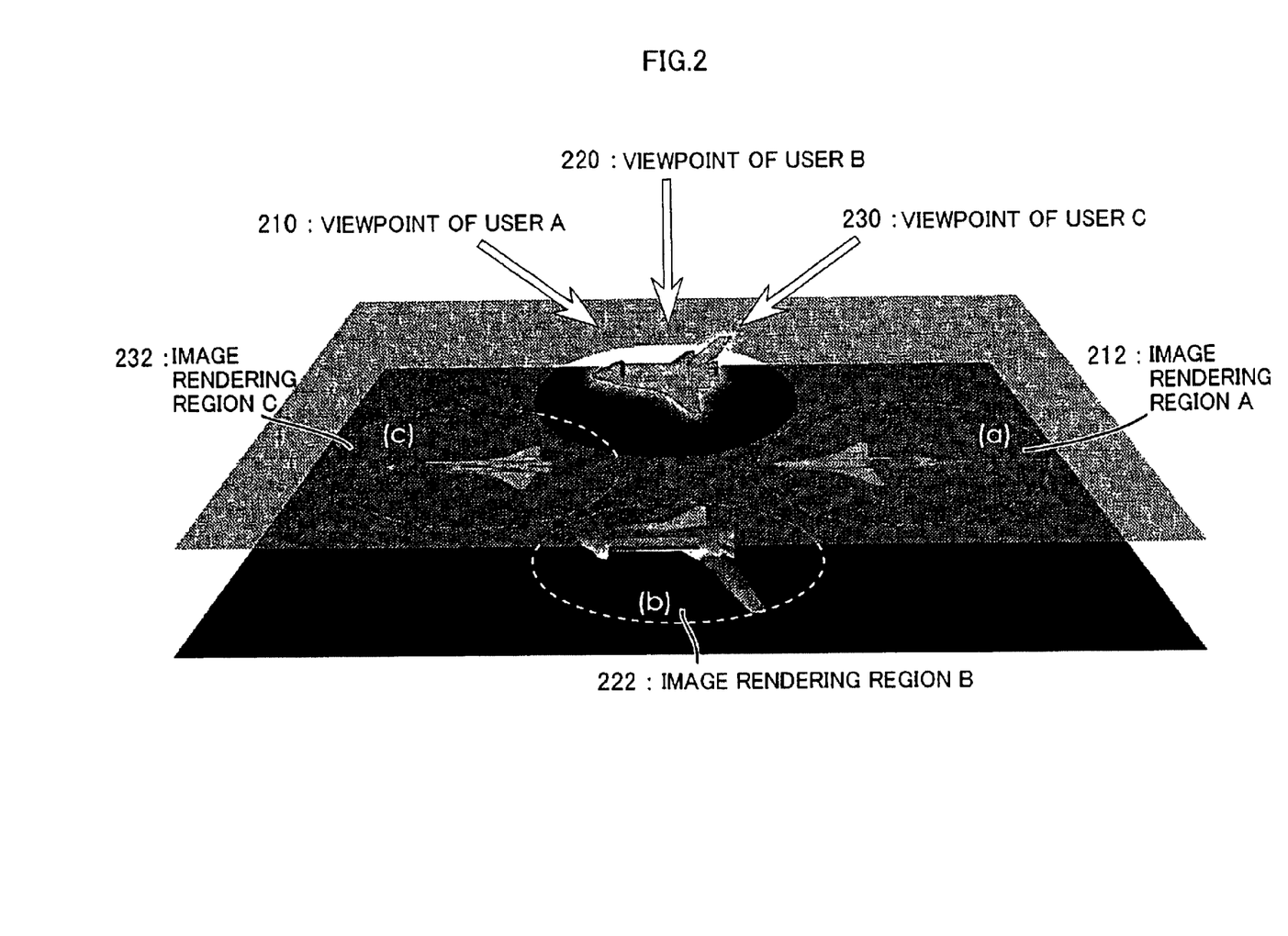
FIG. 2 is a diagram showing an example of a display according to an embodiment of the present invention.

By introducing such a display mask 114, as shown in FIG. 2, the viewable region upon the display surface varies depending on the viewpoint position of the user. As a result, it becomes possible to vary the contents exhibited to each user. In addition, with this configuration, it becomes possible to coordinate with the interactive viewpoint movement of a user. In the case where the viewpoint position of a user moves, the region viewable by the user also changes depending on that movement. Accordingly, by detecting viewpoint position using the position sensor and displaying at a region befitting that viewpoint position, it is possible to adapt to the movement of the viewpoint position of the user.

Moreover, with a system using this technique, by presenting an image having disparity between the respective right and left viewpoint for every display region and for every viewpoint position, it becomes possible to perform three-dimensional display for all viewers. As a result, a multi-person shared three-dimensional virtual space can be realized as three-dimensional display is being performed for all viewers in the same virtual space.

For example, a magnetic sensor having 6 degrees of freedom can be used as the viewpoint position detection sensor. The magnetic sensor can detect the current position by detecting magnetic flux cutoff in every respective direction x, y, and z. Assuming that the direction of the line of sight faces the center of the hole upon the mask and that a line connecting both eyes parallels the horizontal surface, that direction of the line of sight can be calculated in real time from the viewpoint position detected.

Besides the magnetic sensor utilizing a magnetic field as described above, it is also possible to use any well known sensor utilizing an electric field, an electromagnetic field, ultrasonic waves, or the like, as the position detection sensor. In addition, the position detection sensor may be constructed integrated in the liquid crystal shutter glasses.

Figure 3:
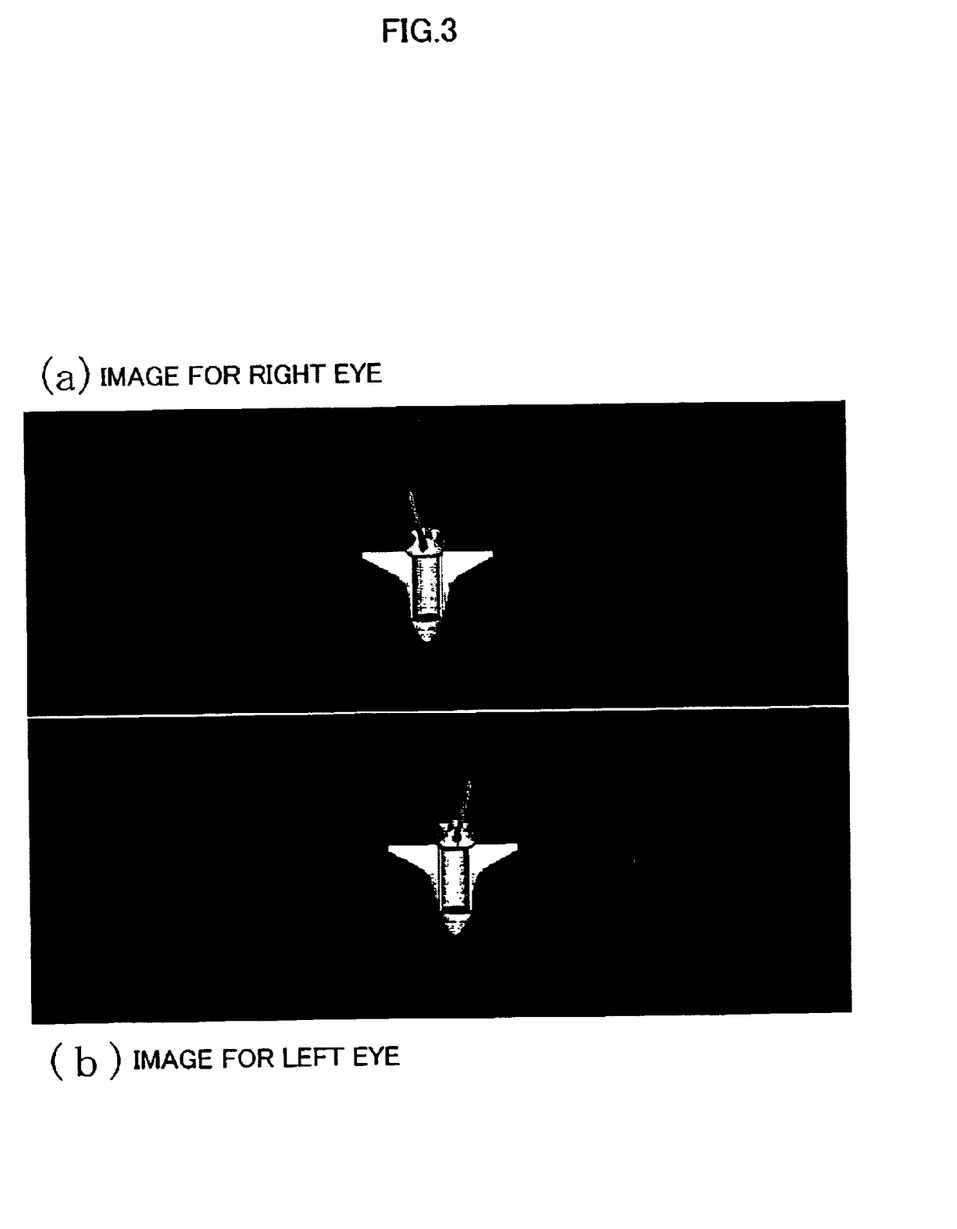
FIG. 3 is a diagram showing an example of an image produced by this embodiment.

The processing device 130 is provided comprising projecting an image for the respective right and left viewpoint derived and time-divided, alternating displaying upon a display 112 synchronous to the liquid crystal shutters. Actually, as shown in FIGS. 3(a) and (b), outputting images corresponding to the respective right and left viewpoints to the respective upper and lower half of the entire screen and switching between the respective top and bottom half thereof, this system displays enlargement thereof. This allows, for example, a display frequency of 120 Hz to be divided into 60 Hz to show the right and left images. The liquid crystal shutters switch between both right and left, viewable and non-viewable, by synchronizing with the image refresh rate. The fact that the display 112 is viewed through the liquid crystal shutter glasses makes it possible to obtain images that correspond to the respective right and left viewpoints, thereby allowing three-dimensional viewing.

In the above description, the top and lower halves are output one at a time; however, in what manner division and display are carried out, or whether display is carried out without division, or if display is accomplished through interlacing or so forth, can be freely set. Further, besides a display device that provides a normal light-emitting surface to be directly viewed, a projector type display device may also be used.

<Viewpoint Position>

Figure 4:
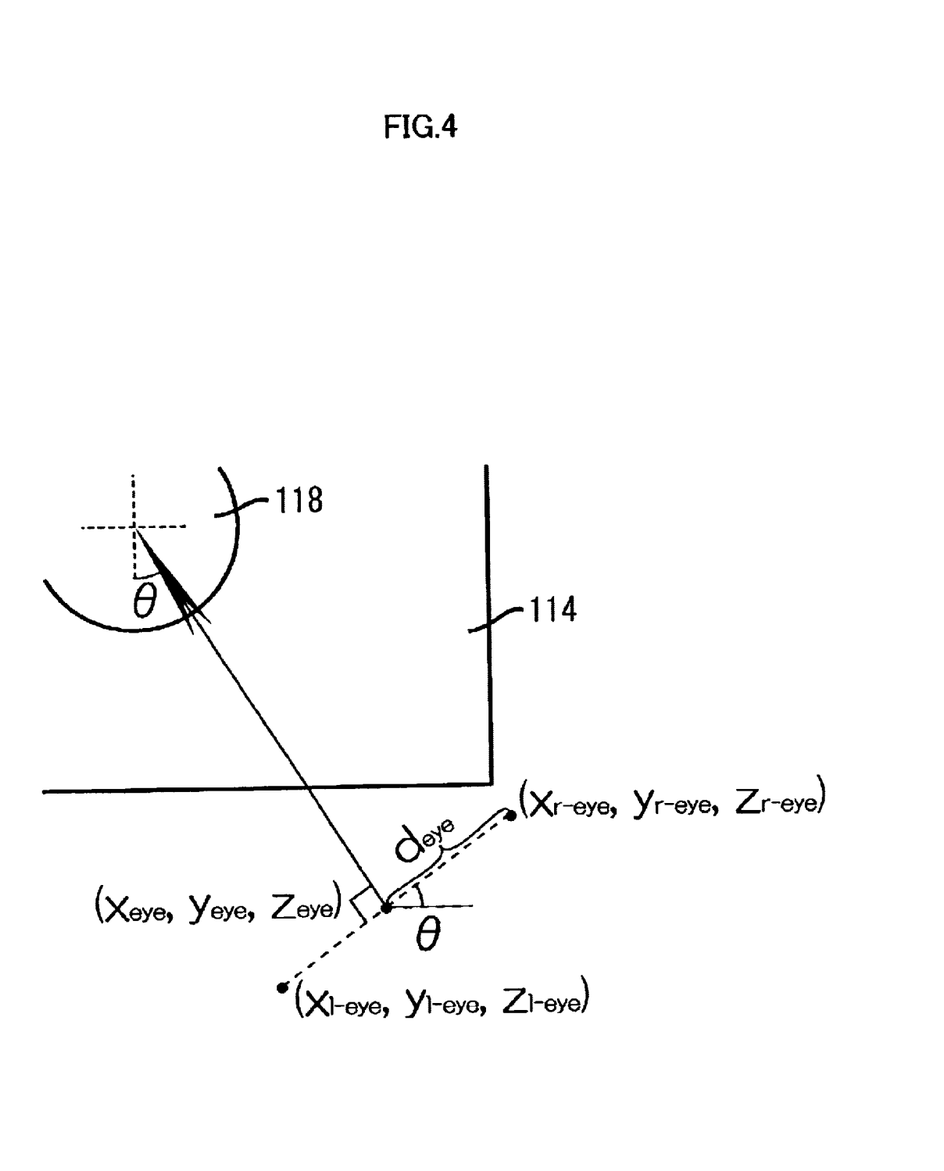
FIG. 4 is a diagram showing an example of coordinates in the case where viewpoint is calculated.

Next, using FIG. 4, how the position of both the left and right eye is calculated so as to perform three-dimensional display is described; where that position is derived, assuming the viewpoint position obtained using the positional sensor to be equal to the center of the eyes, based on the direction of the line of sight and the attitude angle derived from calculations. As shown in FIG. 4, the center position of the user's eyes and the distance from the center to both of the respective eyes, the rotational angle of the light of sight from the straight forward direction, along with the position of both respective eyes are defined as the following:

| | | |
|---|---|---|
| $(x_{eye}, y_{eye}, z_{eye})$ | center position between both eyes | (1) |
| $d_{eye}$ | distance to both respective right and left eyes | |
| $\theta$ | rotational angle of the line of sight from the straight forward direction | |
| $(x_{l\text{-}eye}, y_{l\text{-}eye}, z_{l\text{-}eye})$ | position of left eye | |
| $(x_{r\text{-}eye}, y_{r\text{-}eye}, z_{r\text{-}eye})$ | position of right eye | |

When defined as in (1) above, the right and left viewpoint positions can be derived as the following equations (2):

$$x_{l\text{-}eye} = x_{eye} - d_{eye} \cos\theta$$

$$y_{l\text{-}eye} = y_{eye} - d_{eye} \sin\theta$$

$$z_{l\text{-}eye} = z_{eye}$$

$$x_{r\text{-}eye} = x_{eye} - d_{eye} \cos\theta$$

$$y_{r\text{-}eye} = y_{eye} - d_{eye} \sin\theta$$

$$z_{r\text{-}eye} = z_{eye}$$

In this case, if the positional sensor is constructed integrated with glasses incorporating liquid crystal shutters, error is especially small, and it is possible to calculate the viewpoint position from the positional information obtained by the positional sensor, as described above.

<Setting of Projection Surface>

When movement of the viewpoint position is considered, it becomes necessary to set the position of the projection surface so that it is capable of handling the positional relationship of the viewpoint and the display surface. The method where the projection surface and the display surface are made to match can be used as a most basic method of appropriately setting the projection surface. With this method, in the case where the absolute position of the display surface within the real world is invariant, the absolute position of the projection surface within the virtual world is also invariant, there is no need to consider correction of the absolute position of the projection surface, and it becomes acceptable to consider only the relative position from the viewpoint.

In addition, when the position of a virtual object assumed to exist lies on the other side of the viewpoint relative to the display surface in real space, in other words, in the case where the display surface is thought of as a window and one is peering into the virtual world through the window, the projection surface should be set to match the display surface in the simplistic manner described next.

However, generally, in the system for rendering the virtual world, since the virtual world in front of the projection surface relative to the viewpoint is impossible to render, in cases where a virtual object exists on the side in front of the display surface relative to the user, it is not appropriate to set the projection surface to match the display surface.

Figure 5:
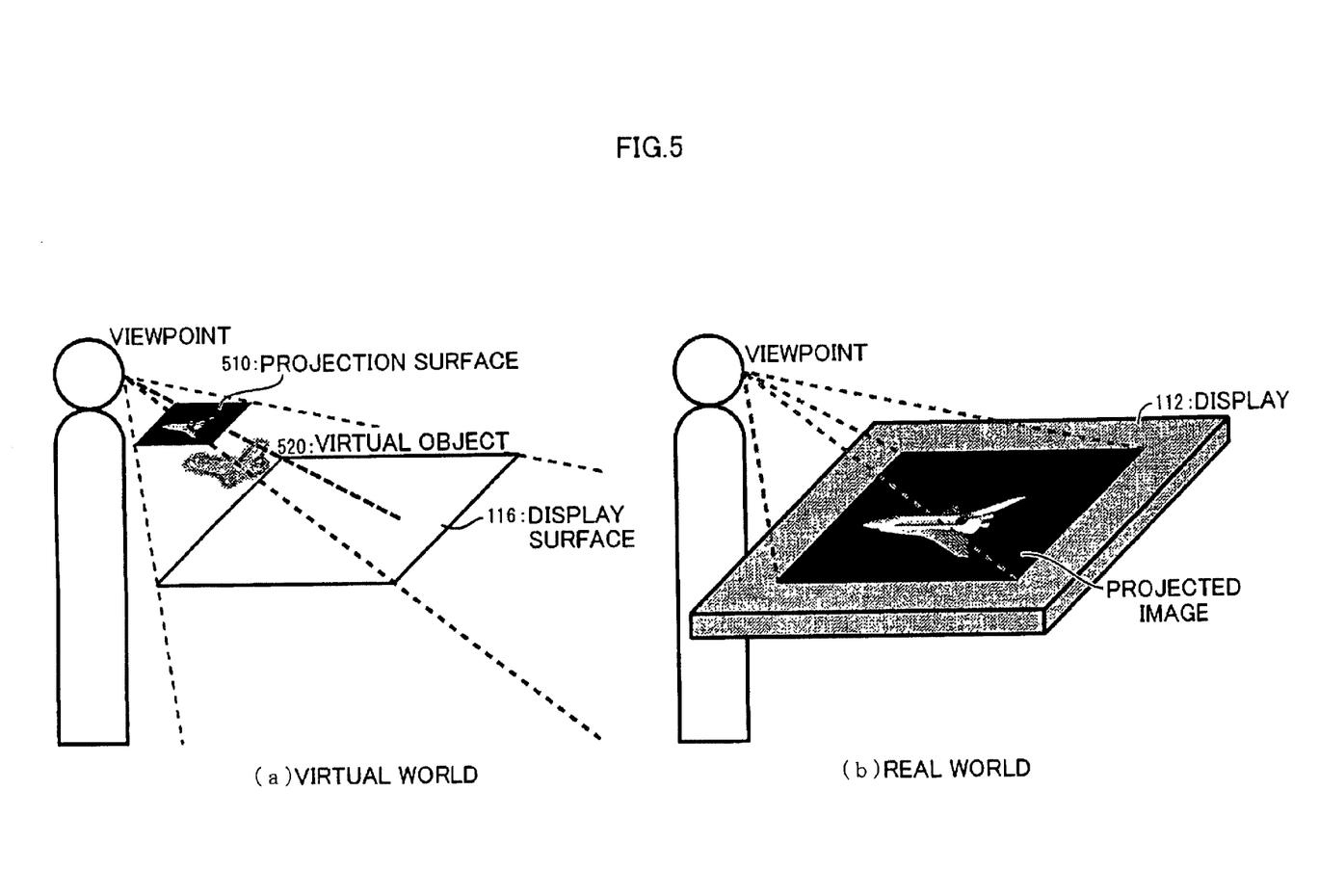
FIG. 5 is a diagram showing the relationship between the display surface and a virtual object.

Therefore, with the system of this embodiment, as shown in FIG. 5(a), assuming the rectangular area, which has four apexes that match each respective intersection of the four straight lines connecting each respective four nodes of a display surface 116 to the viewpoint and a plane at the rear of which the virtual object 520 exists parallel to the display surface 116 to be a projection surface 510, the projected image is enlarged and displayed upon the display surface 116 providing appropriate presentation of an image. It is noted that in the case where such a method is used, since the absolute position itself of the projection surface 510 changes, it is necessary to derive the absolute position of the projection surface 510 for every change in viewpoint position.

FIG. 5(b) shows an example of a display screen in the case where a relationship among the projection surface, the display surface, and the virtual object such as that shown in FIG. 5(a) is assumed. If a relationship such as that shown in FIG. 5(a) is assumed, that which is to be shown upon the display surface 116 in the real world is an enlarged image.

In this manner, with the system of this embodiment, it is possible to freely set the relationship between the display surface and the projection surface. This makes it possible to display a virtual object by setting the projection surface without being limited to the actual display surface.

<Derivation of Display Region and Display>

A display region corresponding to the viewpoint position of the user is derived and image rendering is performed in that region. On this occasion, when the hole 118 upon display mask 114 is circular, the display region corresponding to the position of the user viewpoint is also circular, and the position of the center thereof is determined in conformity with the following two parameters.

Position of the viewpoint upon the display coordinate system

Distance between the mask and the display surface

It is noted that with the system of this embodiment, the distance between the mask 114 and the display surface 116 is fixed.

Figure 6:
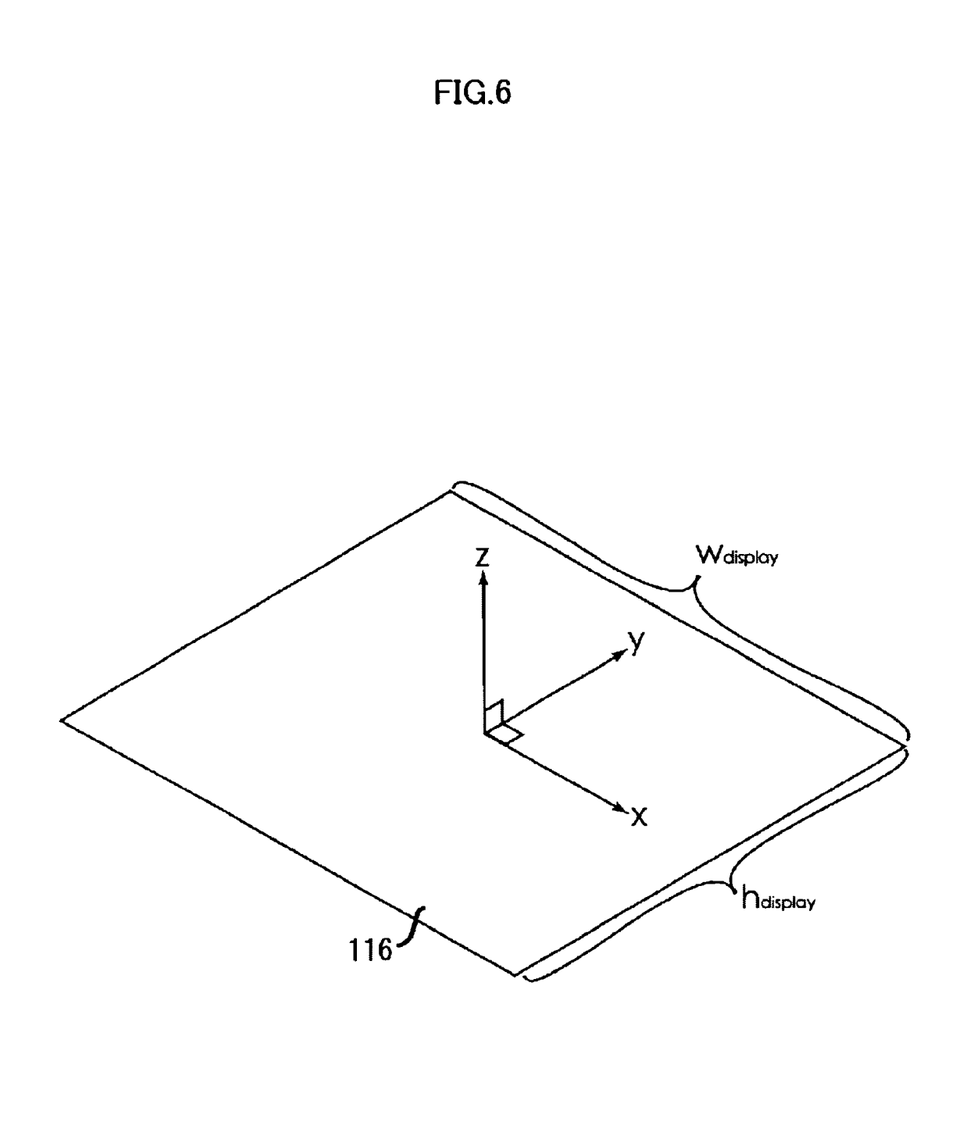
FIG. 6 is a diagram showing how a coordinate axis is determined.

The center of the display surface 116 is made the origin, the coordinate system having the center of display surface 116 as the origin is set as shown in FIG. 6, with the viewpoint upon that coordinate system, the distance between the mask and the display surface, and the position of the center of the display region being defined as the following:

| | |
|---|---|
| $(x_{eye}, y_{eye}, z_{eye})$ | viewpoint position |
| $d_{mask\text{-}display}$ | distance between mask and display surface |
| $(x_{center}, y_{center}, z_{center})$ | center position of display region |

Figure 7:
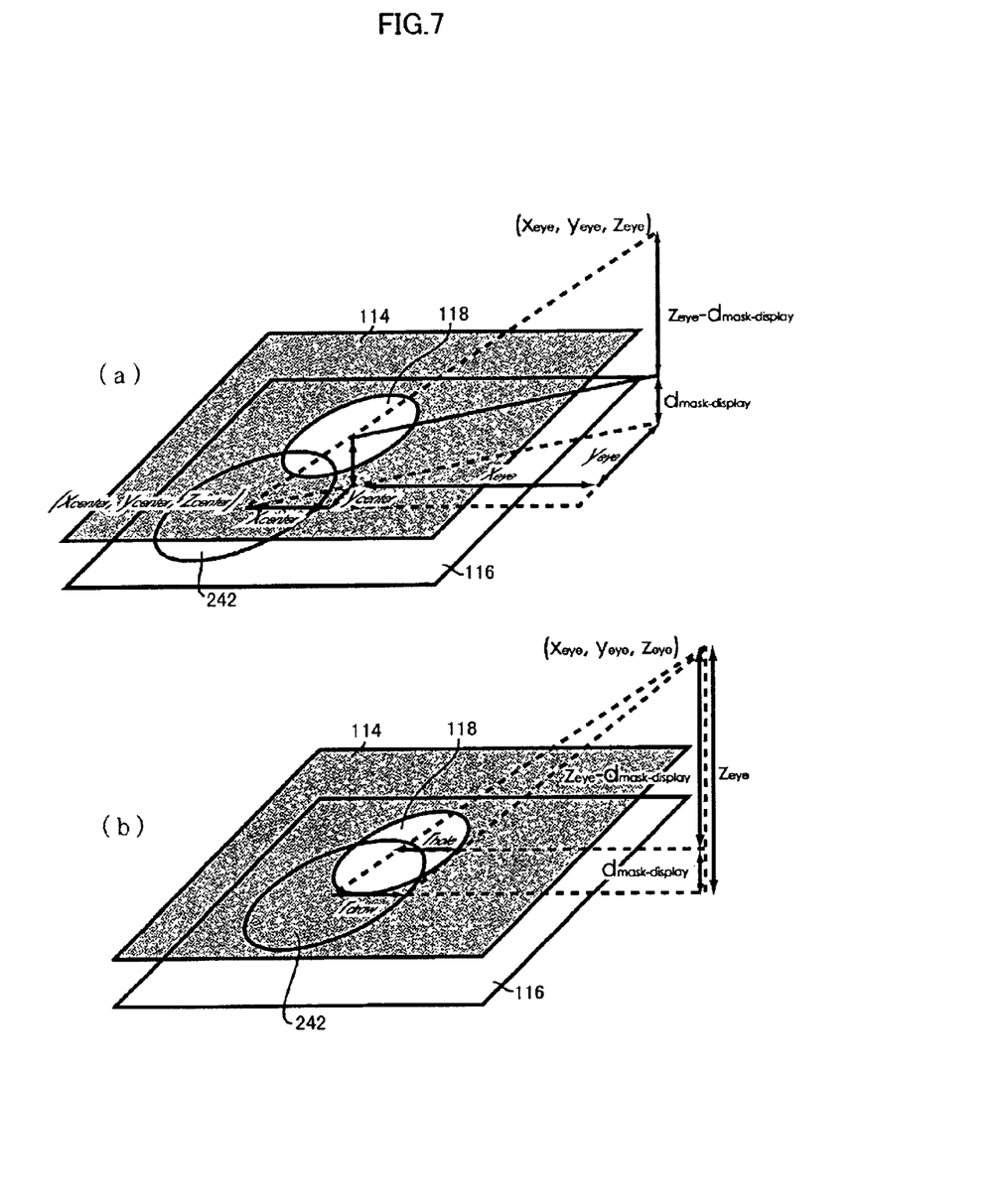
FIG. 7 is a diagram showing display area for the viewpoint of a user.

Based on the above-mentioned definitions, as shown in FIG. 7(a), the center position of a display region 242 is derived from the following relational expression:

$$x_{center} = -x_{eye} \times \frac{d_{mask-display}}{z_{eye} - d_{mask-display}} \quad (3)$$

$$y_{center} = -y_{eye} \times \frac{d_{mask-display}}{z_{eye} - d_{mask-display}}$$

$$z_{center} = 0$$

In addition, as shown in FIG. 7(b) the radius defining the magnitude of the circular display region 242, is derived from the following three parameters:

distance of the viewpoint from the display surface distance between the mask and the display surface radius of the hole upon the mask Here the radius of the hole 118 upon the mask 114 and the radius of the display region 242 are respectively defined as the following:

| | |
|---|---|
| $r_{hole}$ | radius of the hole on the mask |
| $r_{draw}$ | radius of the display region |

In this case, the radius $r_{draw}$ of the display region is represented by the following:

$$r_{draw} = r_{hole} \times \frac{z_{eye}}{z_{eye} - d_{mask-display}}$$

By performing processing of the display region in the above manner, it is possible to perform display of an image for every user in the display region 242 that is dynamically derived in accordance with the position of the respective user.

<Detection of Overlapping Display Regions>

Since there is a plurality of users, it is necessary to perform an overlapping search among regions derived in conformity with the processing described above. In the case where the display region is circular, detection of an overlapping region can be performed through the relationship of the distance between centers and the sum of the radiuses. With a system of this embodiment, when overlapping is detected, the users can be alerted to an overlapping display region through, for example, the rendering of a demarcation line for the display region.

With the system of this embodiment, for example, the display has a rectangular shape with a width of 1360 mm and height of 1020 mm, and from the surface of the floor the height of the display surface is 1000 mm. The distance between the display mask and the display surface is 150 mm and the radius of the mask hole is 200 mm.

<Other Embodiments>

The system of the embodiment described above is an example where the display surface is placed horizontally; alternatively, the display surface may naturally be placed vertically or at a slant. If the display is made to be the projection type, it is possible to achieve a large screen display. In addition, in order to configure a large display, a plurality of displays may be combined.

Figure 8:
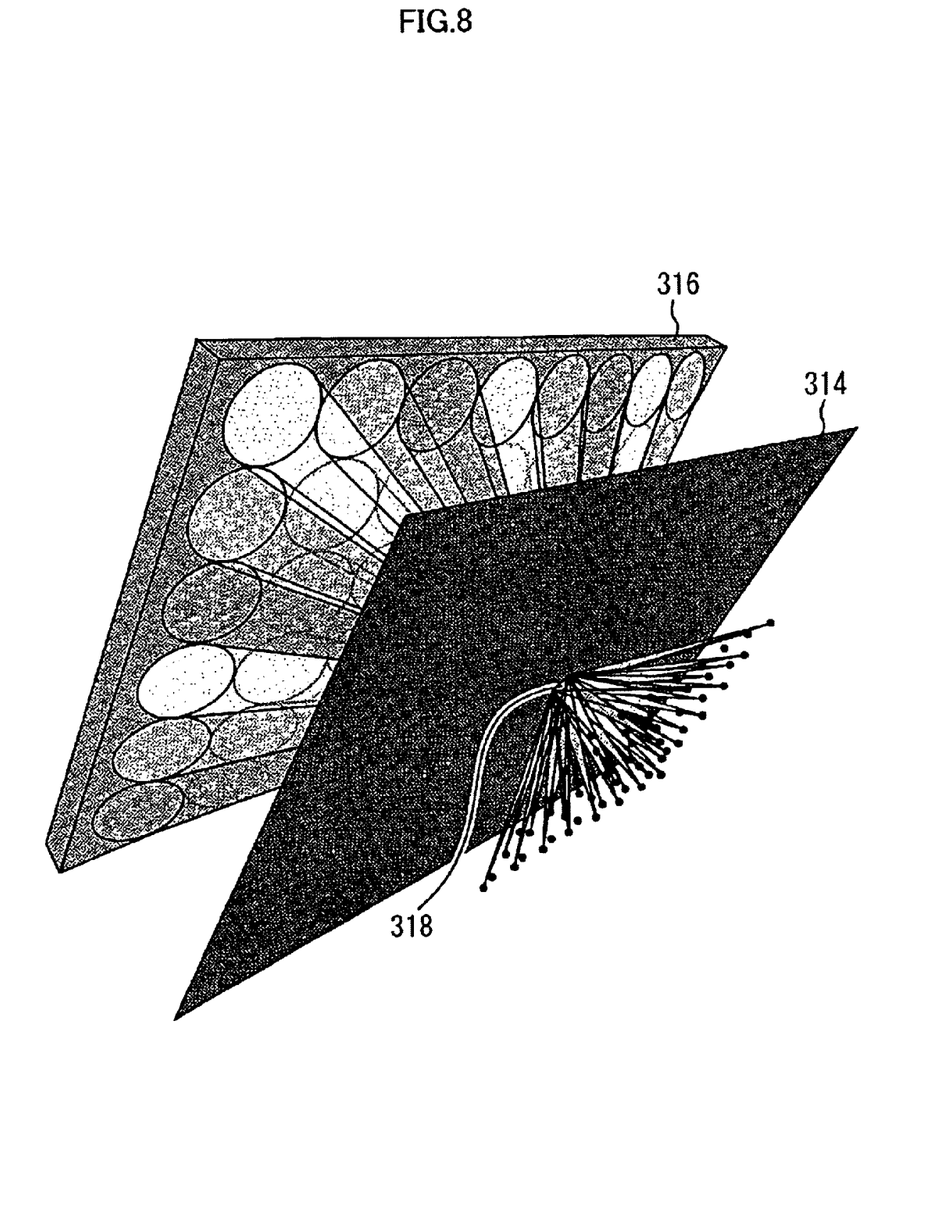
FIG. 8 is a diagram showing an embodiment of a theatre display device.

FIG. 8 shows a theatre-style multi-person shared three-dimensional display device capable of being used by multiple persons. With the theatre style multi-person shared three-dimensional display device, for example, given a width of 25 m, height of 18 m, distance of 6 m between the display mask and the display surface, radius of 0.5 m for the mask hole of the display mask, a maximum of forty-eight persons can simultaneously view the respective videos.

It is not necessary to make the hole upon the display mask circular; for example, a rectangular shape is also allowable.

If the display mask is configured with liquid crystal, it is possible to control the radius, shape, and location of the hole of the display mask through the permeability and non-permeability of the liquid crystal.

In addition, in order to control the radius, etc. of the hole of the display mask, for example, a mechanical mechanism such as an aperture mechanism or the like can be used.

With the multi-person shared three-dimensional display apparatus described above, glasses with attached shutters are utilized wherein the opening and closing of the shutters is synchronized and images corresponding to the left/right line of sight are displayed to obtain a three-dimensional image; however, the present invention is not limited to this method for obtaining a three-dimensional view. For example, a filter based on polarization or color may be used as the glasses to be worn to segregate images corresponding to the left and right lines of sight.

In addition, as an example of three-dimensional display not using glasses, there is the display device mentioned in, for example, Japanese Patent Application Laid-open No. 2001-13457.

Figure 9:
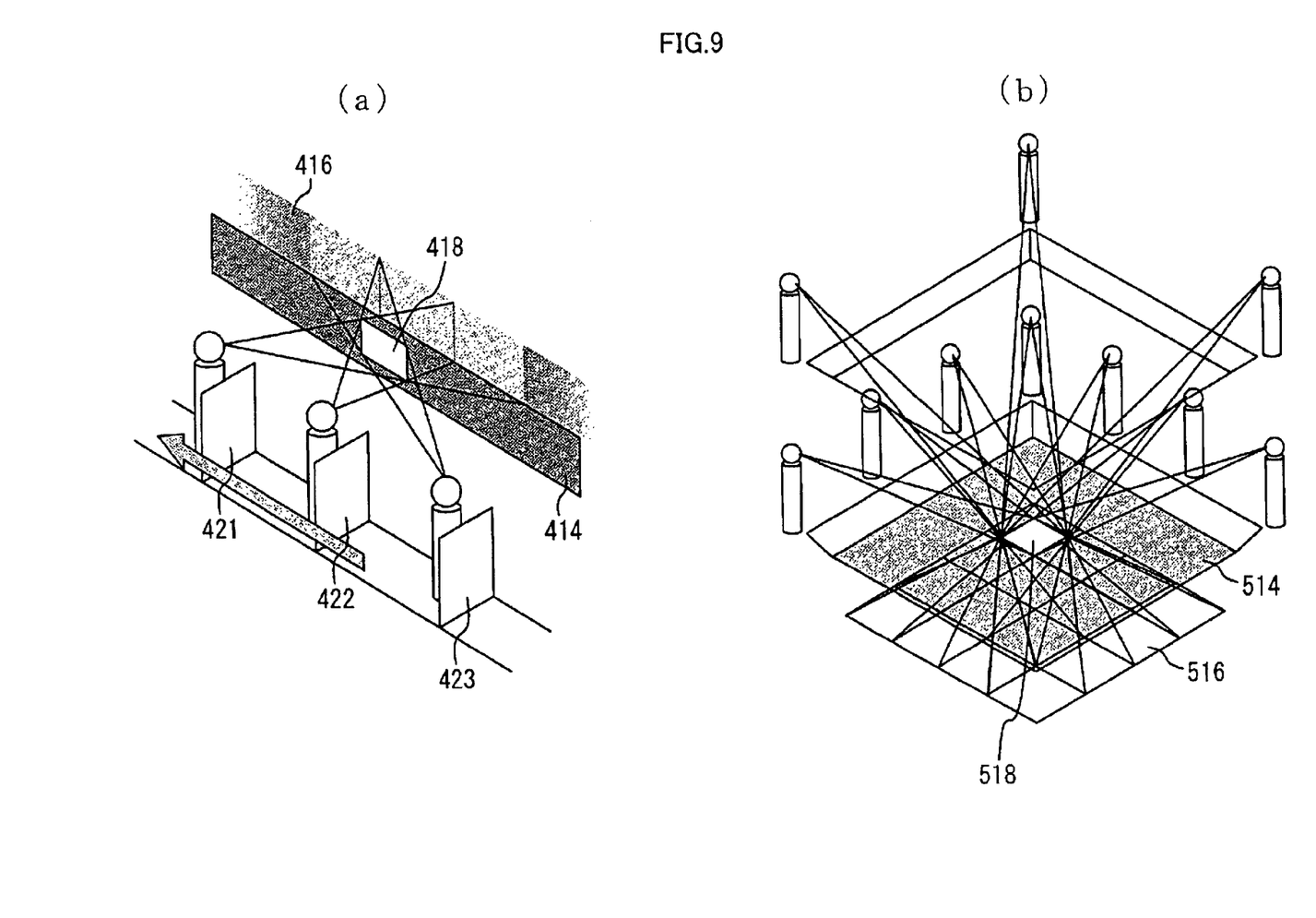
FIG. 9 is a diagram showing a configuration applied to entertainment purposes.

It is possible to use these multi-person shared three-dimensional display devices, for example, for entertainment purposes. A configuration example corresponding to such entertainment purposes is shown in FIG. 9. In FIG. 9(a), audience members traveling aboard carts 421, 422, and 423, respectively, view a display 416 via a hole 418 in display mask 414. FIG. 9(b) shows a configuration where a three-dimensional image displayed on a display 516 is viewed through a hole 518 in a display mask 514 while a plurality of audience members are moving about a central stage.

Figure 10:
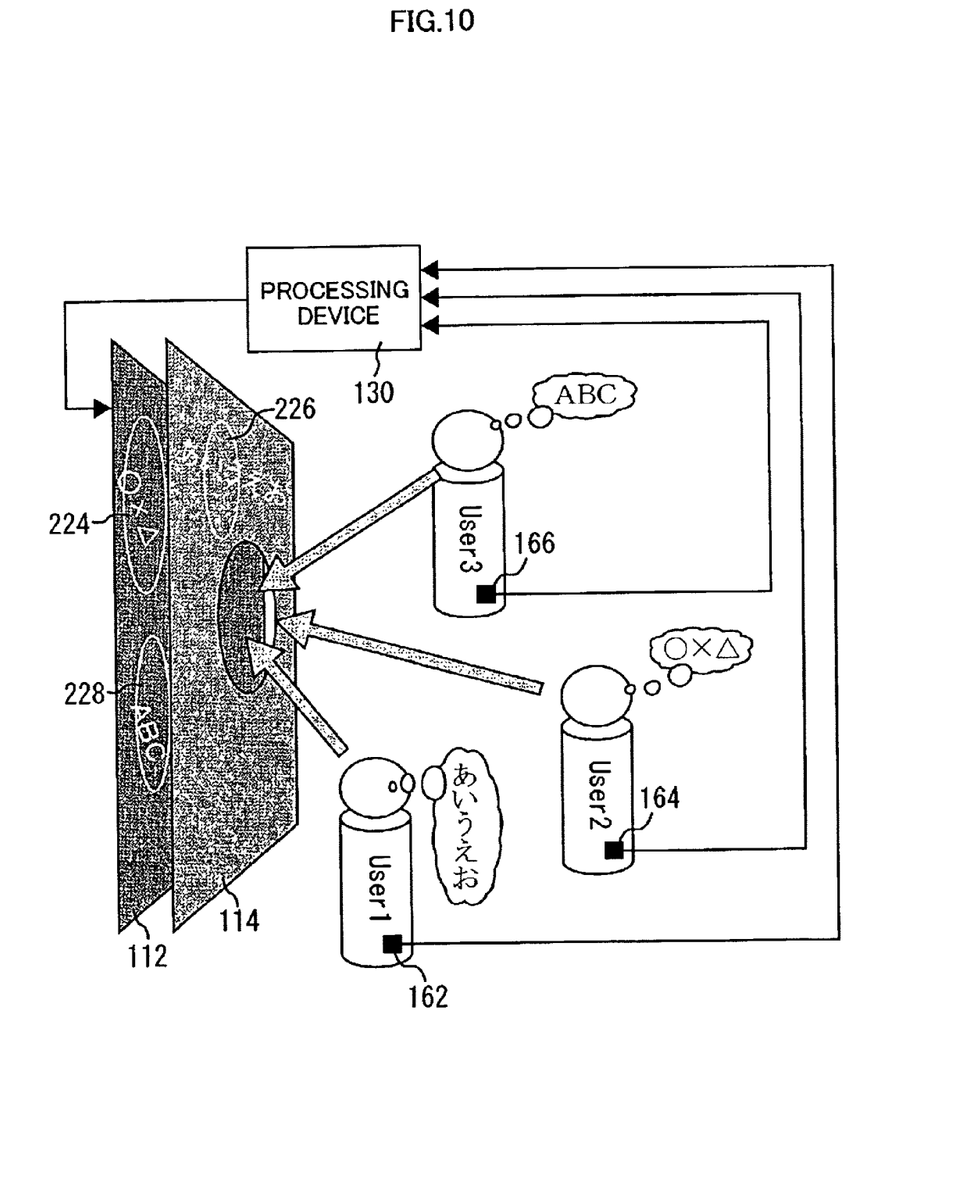
FIG. 10 is a diagram showing an example where information is displayed.

When the fact that display on a display surface is possible by separating images for every person with a display hole is utilized, not only images for three-dimensional viewing, but also display of different information for each person is possible. An example of this configuration is shown in FIG. 10. This configuration, as shown in FIG. 10, is a fundamentally similar configuration as the multi-person shared three-dimensional display device shown in FIG. 1. With this configuration, sensors 162, 164, 166 are attached to each audience member and the respective position of each audience member is detected through a processing device 130. The processing device 130, in conformity with the detected positions, performs display corresponding to each person on the display regions 224, 226, 228 respectively associated with each audience member.

With the multi-person shared display device of the present invention, it is possible to perform appropriate display corresponding to viewpoint movement for a plurality of persons.

With this multi-person shared display device, the relative positions between the viewpoint and projection surface in the virtual world are appropriately corrected corresponding to changes in the relative positions between the viewpoint and projection surface in the real world. Moreover, with the present invention, for example with a single fixed display, a three-dimensional image can be displayed for a plurality of moving users having neither flickering nor spatial distortion. In addition, regions of viewpoint movement allowing a user to obtain an appropriate image have also been described in detail.

The present invention is applicable to not only a stand-alone computer system, but may also be made applicable to, for example, a client server system or the like configured from a plurality of systems.

It is possible to provide a configuration of the present invention by having a system read out a program relating to the present invention from storage media stored with the program and execute it. Such storage media includes floppy disks, CD-ROMS, magnetic tape, and ROM cassettes.

INDUSTRIAL APPLICABILITY

With the display device of the present invention, an image rendered upon a screen in compliance with the individual audience member positions is viewed via a hole of an appropriate size an appropriate distance from the screen. As a result, it is possible to view video in compliance with the individual viewpoint positions of a plurality of persons.

Technology relating to such a multi-person shared display device is capable of wide range industrial applicability, for example as a device for viewing three-dimensional objects.

What is claimed is:

1. A multi-person shared display device, which is a display device shared by a plurality of users, comprising:
   a display device, which displays a plurality of images for a plurality of users on a screen;
   a display mask, which is disposed so as to cover said display device separated by a fixed distance and has one fixed sufficiently large hole through which each of said plurality of users watches said image corresponding to the user on said display device, and by which a visible region upon the display surface varies depending on viewpoint position of each of the users;
   a position sensor, which detects a location of the user in real space corresponding to said display device; and
   a processing device, which is dynamically combined with said display device and said position sensor, and varies an image upon said display device in accordance with said location of the user through said position sensor so that relative positions between viewpoint and said display device are appropriately corrected corresponding to changes in the relative positions.

2. The multi-person shared display device according to claim 1, wherein
   said image to be displayed upon the display device includes video for three-dimensional viewing.

3. The multi-person shared display device according to claim 2, wherein
   each user wears a plurality of glasses for separating said video for three-dimensional viewing displayed into that for the right eye and that for the left eye; and
   the plurality of video for three dimensional viewing shown on said display device, is images allowing separation between that for the right eye and that for the left eye through said plurality of glasses.

4. The multi-person shared display device according to claim 3, wherein said glasses are glasses in which shutters for the right eye and for the left eye open and close; and said processing device is dynamically combined with said glasses.

5. The multi-person shared display device according to either claim 3 or claim 4, wherein said glasses and said position sensor are formed as an integral unit.

6. The multi-person shared display device according to claim 1, further including a shutter for right eye and for left eye open and close wherein said processing device is dynamically combined with said shutter.

7. A multi-person shared display device, which is a display device shared by a plurality of users, comprising:
   a display device, which displays a plurality of video for a plurality of users on a screen, wherein said video to be displayed upon the display device includes video for three-dimensional viewing;
   a display mask, which is disposed so as to cover said display device separated by a fixed distance and has a sufficiently large hole;
   a position sensor, which detects a location of a user in real space corresponding to said display device; and
   a processing device, which is dynamically combined with said one display device and said position sensor, and displays an image corresponding to each user upon said display device in accordance with said position of the user through said position sensor
   wherein each user wears a plurality of glasses for separating said video for three-dimensional viewing displayed into that for the right eye and that for the left eye;
   the plurality of video for three dimensional viewing shown on said display device, is images allowing separation between that for the right eye and that for the left eye through said plurality of glasses;
   said glasses are glasses in which shutters for the right eye and for the left eye open and close; and
   said processing device is dynamically combined with said glasses.

8. The multi-person shared display device according to claim 7, wherein said glasses and said position sensor are formed as an integral unit.

* * * * *